Aug. 6, 1929.  H. LAMPLOTA  1,723,186
COFFEE PERCOLATOR
Original Filed May 9, 1928
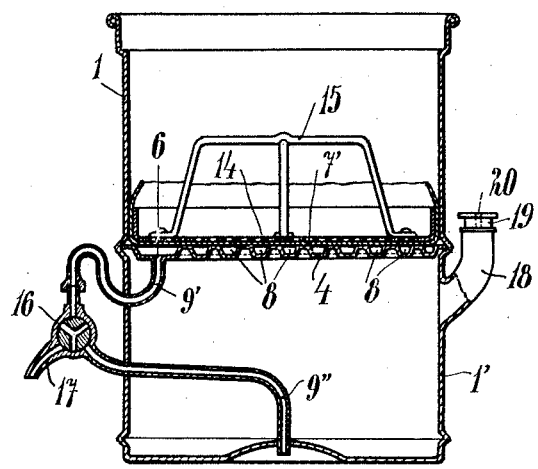
Inventor:
Hubert Lamplota.

Patented Aug. 6, 1929.

1,723,186

UNITED STATES PATENT OFFICE.

HUBERT LAMPLOTA, OF BRNO, CZECHOSLOVAKIA.

COFFEE PERCOLATOR.

Original application filed May 9, 1928, Serial No. 276,453, and in Czechoslovakia December 9, 1927. Divided and this application filed March 28, 1929. Serial No. 350,658.

The object of the present invention is to produce a coffee percolator for restaurants and the like which allows liquid to be conveniently stored as well as drawn direct from the filter, and the invention consists in the provision of a percolating vessel having a double bottom forming a space for the reception of hot water, the upper bottom being formed with a discharge aperture and with lugs adapted to support a filtering element so that the liquid can flow between the lugs to the discharge aperture, a pipe being led from the aperture to a three-way cock arranged outside the vessel, while another pipe leads from the three-way cock through the space between the bottoms for discharging liquid into a storage receptacle.

The invention is illustrated in the accompanying drawing which represents a sectional view of the percolating vessel.

The device comprises a percolating vessel 1 which is adapted to be supported, either on a heating source or on a storage receptacle into which the liquid can be discharged. The vessel is provided with two bottoms the upper one 4 of which is formed with a discharge aperture 6 and with a plurality of ribs or lugs whereon a filter paper or cloth 7' can be supported so as to enable the liquid to flow through the passages 8 between the lugs to the discharge aperture. A perforated dish 14, provided with handles 15, is placed on the filter paper or cloth so as to keep it in position. The space 1' between the two bottoms is intended for the reception of water which is either originally hot or heated by placing the vessel on a heating source, the water being introduced through a funnel 18. The discharge aperture 6 communicates through a pipe 9' with a three-way cock 16 arranged outside the vessel, while another pipe 9" leads from the cock through the space 1' for the discharge of liquid into a storage receptacle upon which the percolating vessel is placed. The cock can be set for drawing liquid direct from the filter through a spout 17 or for delivering the liquid through the pipe 9' into the storage receptacle. As the pipes pass through a space filled with hot water, the liquid can be maintained at a high temperature.

The funnel 18 is provided with a stopper 19 in which there is an air and steam vent 20.

I claim:

A coffee percolator comprising a vessel having a double-bottom, a filling funnel communicating with the space between the bottoms, the upper bottom being formed with a discharge aperture and provided with lugs adapted to support a filtering element so that the liquid can pass between the lugs to the discharge aperture, a three-way cock arranged outside the vessel, a pipe connecting the cock with said discharge aperture, and two discharge pipes emanating from said cock, one of said pipes being led through the space between the two bottoms.

HUBERT LAMPLOTA.